United States Patent [19]

Diggs

[11] Patent Number: 5,141,067
[45] Date of Patent: Aug. 25, 1992

[54] BICYCLE POWER PACK

[76] Inventor: Thomas M. Diggs, 1349 Otis St., NE., Washington, D.C. 20017

[21] Appl. No.: 612,989

[22] Filed: Nov. 15, 1990

[51] Int. Cl.⁵ ............................................ B62D 59/04
[52] U.S. Cl. ...................................... 180/11; 180/15; 280/204
[58] Field of Search ............... 180/14.2, 15, 16, 11, 180/206, 209, 24.02; 280/204, 210, 212, 304.5

[56] References Cited

U.S. PATENT DOCUMENTS

| | | | |
|---|---|---|---|
| 725,924 | 4/1903 | Belcher | 180/11 |
| 858,496 | 7/1907 | Baines | 180/11 |
| 1,337,437 | 4/1920 | Call | 180/11 |
| 1,373,918 | 4/1921 | Smith | 180/11 |
| 1,407,597 | 2/1922 | Smith | 180/11 |
| 2,517,162 | 8/1950 | Arman | 180/15 |
| 2,552,846 | 5/1951 | Dinkins | 180/11 |
| 2,822,879 | 2/1958 | Overton | 180/11 |
| 3,815,699 | 6/1974 | Ganskopp et al. | 180/11 |
| 4,346,772 | 8/1982 | Clifft | 180/11 |
| 4,461,365 | 7/1984 | Diggs | 180/11 |

FOREIGN PATENT DOCUMENTS 3630031 4/1988 Fed. Rep. of Germany ........ 180/11

*Primary Examiner*—Charles A. Marmor
*Assistant Examiner*—A. M. Boehler
*Attorney, Agent, or Firm*—Peter L. Klempay

[57] ABSTRACT

The bicycle power pack consists of a frame mounting a motor and transmission mechanism, ground engaging wheels carried by an axle journaled to the frame and a hitch assembly extending forwardly from the frame and attachable to the bicycle rear axle. In order to prevent weight transfer from the power pack to the rear axle of the bicycle, the center of gravity of the power pack is located directly above the axle, thus improving the stability and maneuverability of the bicycle and power pack combination.

2 Claims, 6 Drawing Sheets

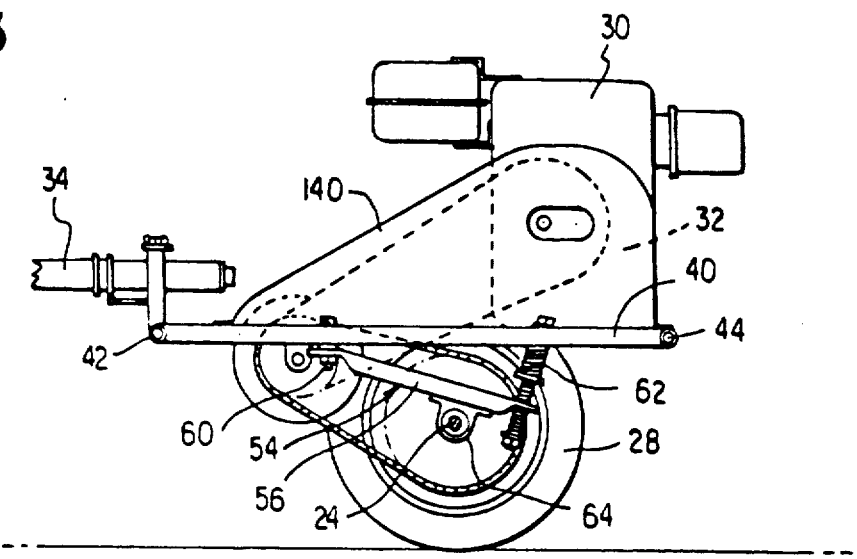

and 12 is a top plan view of the second embodiment.

BICYCLE POWER PACK

The present invention relates to power drive units for bicycles and, more particularly, to improvements in bicycle power units of the type disclosed in my U.S. Pat. No. 4,461,365, granted Jul. 24, 1984.

BACKGROUND OF THE INVENTION

My above-identified patent discloses a device for motorizing a bicycle, the device including a frame having a pair of wheels, an engine mounted on the frame forwardly of the wheels and drivingly connected thereto, a hitch assembly connecting the frame to the rear of the bicycle and controls for the motor. This device serves also as a cargo carrier.

As a result of continued use of and experimentation with the bicycle power pack, I have devised improvements and modifications of the bicycle power pack which serve to enhance the maneuverability and stability of the bicycle and power pack assembly, simplify the power pack control mechanisms, and to otherwise improve the construction and operation of the unit.

SUMMARY OF THE INVENTION

The preferred embodiment of the bicycle power pack of the present invention includes a frame to which is journaled an axle carrying two ground-engaging wheels; a gasoline powered motor mounted on the frame so that the center of gravity of the power pack unit is directly above the axle; a drive train for transfer of power from the motor to the axle and wheels, the drive train including a centrifugal clutch connected to the motor output shaft, a first set of sprockets driven by the clutch, an idler shaft, a second set of sprockets keyed to the idler shaft, a first drive chain connecting a selected one of the first sprockets to a selected one of the second sprockets, third and fourth sprockets keyed, respectively, to the idler shaft and the axle, a second drive chain connecting the third and fourth sprockets, and, for each wheel, an overrunning clutch connecting the wheel to the axle; a hitch assembly connected to the forward end of the frame by a gimbal connection and including a pair of forwardly projecting arms attached to the rear axle of the bicycle; and control linkages extending between handlebar mounted controls and the power pack, the linkages including separable connectors in close proximity to the hitch aasembly attachment points.

A light duty version of the power pack is also disclosed and includes a single ground engaging wheel journaled on a frame assembly which mounts a motor, the center of gravity of the unit again being vertically aligned with the wheel axle; the frame including forward extensions which are attached to the bicycle by pivotal connections at the bicycle rear axle; a lift wire and lever arrangement being provided to raise the power pack when power assist in not desired.

For a more complete understanding of the present invention and the objects and advantages thereof, reference should be had to the accompanying drawings and the following detailed description wherein a preferred embodiment of the invention is illustrated and described.

DESCRIPTION OF THE DRAWINGS

In the drawings:

FIG. 3 is a side elevational view of the power pack, showing the opposite side from that of FIG. 1;

FIG. 4 is top plan view of the power pack, the motor and chain cover having been removed;

FIG. 5 is a bottom plan view of the power pack shown in FIG. 4;

DESCRIPTION OF THE PREFERRED EMBODIMENTS

Figure 1:
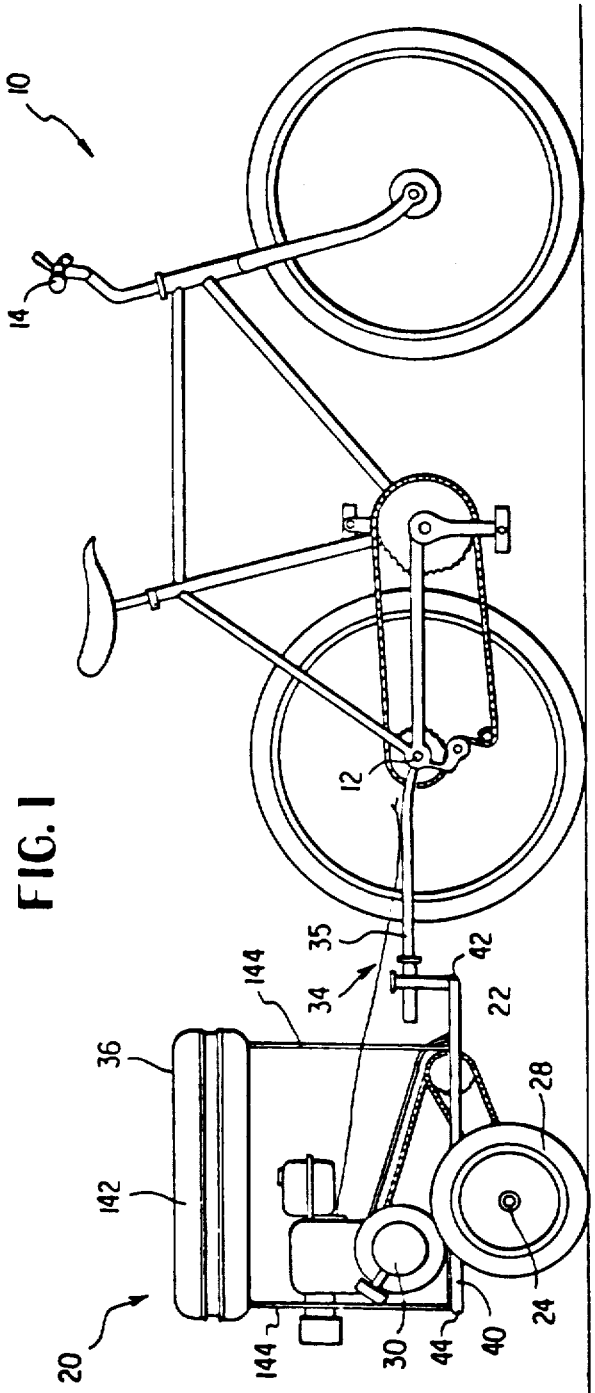
FIG. 1 is a side elevational view of the power pack of the present invention attached to a bicycle.
Figure 2:
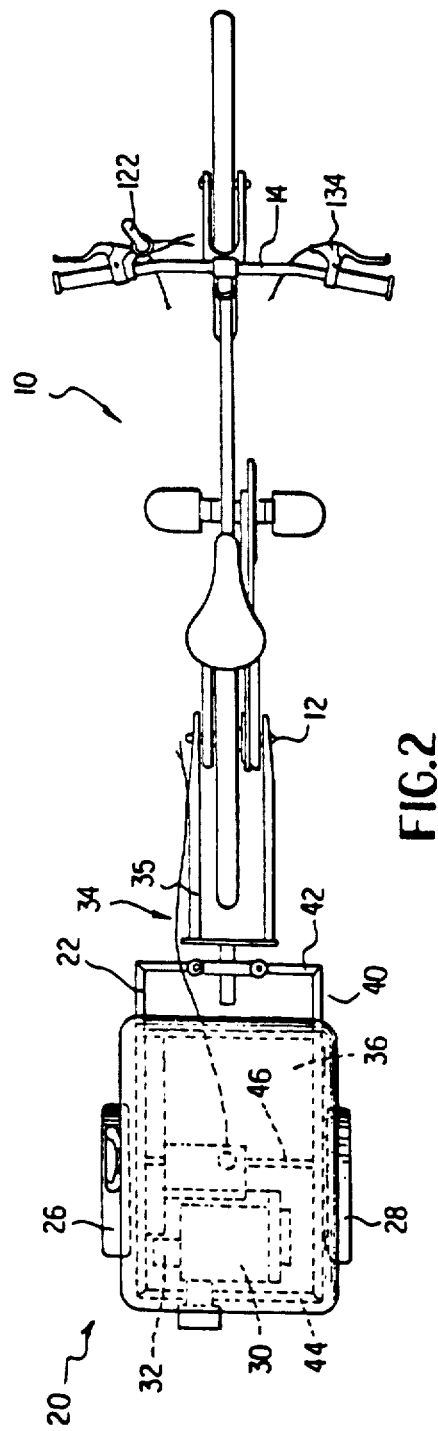
FIG. 2 is a top plan view of the power pack and bicycle.

Having reference first to FIGS. 1 and 2, the numeral 10 designates a conventional bicycle and the numeral 20, the power pack of the present invention. The power pack includes a frame assembly 22 on which are mounted an axle 24 with left and right ground-engaging wheels 26, 28, a motor 30, and a transmission 32 connecting the motor to the axle. A hitch asembly 34 connects the frame assembly 22 to the rear axle 12 of the bicycle and motor and control linkages extend from the bicycle handlebars 14 to the motor and transmission. The power pack also, preferably, includes an article-carrying compartment 36.

Frame assembly 22 includes a main frame which may be fabricated of steel tubing and includes a pair of side members 40 connected by front and rear members 42 and 44, respectively, and an intermediate transverse bar 46. Extending between and attached to the transverse bar 46 and rear member 44 and offset laterally from the longitudinal centerline of the frame is an intermediate longitudinal bar 48 which supports one end of a second intermediate transverse bar 50, the other end of which is supported by one of the side members 40. This latter transverse bar and the rear frame member 44 carry a pair of slotted plates 52 which serve as the motor mount. A subframe, designated generally by the numeral 54, also preferably fabricated of steel tubing, includes a pair of side bars 56 and is connected to the side members 40 of the main frame by spring and bolt assemblies 60 and 62, the mounting arrangement being shown in greater detail in my above-mentioned U.S. Pat. No. 4,461,365 to which reference should be had. Bearings 64 mounted on the subframe side bars 56 journal the axle 24.

The motor 30 is, preferably, a one cylinder gasoline engine and is secured to the frame assembly by bolts 66 extending through the slots in the mounting plates 52. It will be noted that the motor is positioned on the frame so that the center of gravity of the power pack assembly is vertically aligned with the axle 24. This arrangement is of importance as it improves the stability of the bicycle and power pack combination by avoiding weight transfer to the rear wheel of the bicycle.

Figure 6:
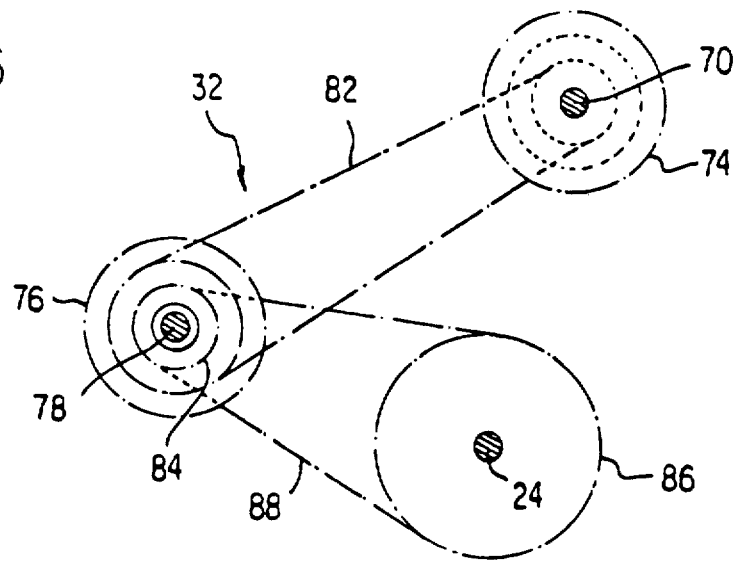
FIG. 6 is a schematic elevational view of the power transmission of the power pack of the present invention.
Figure 7:
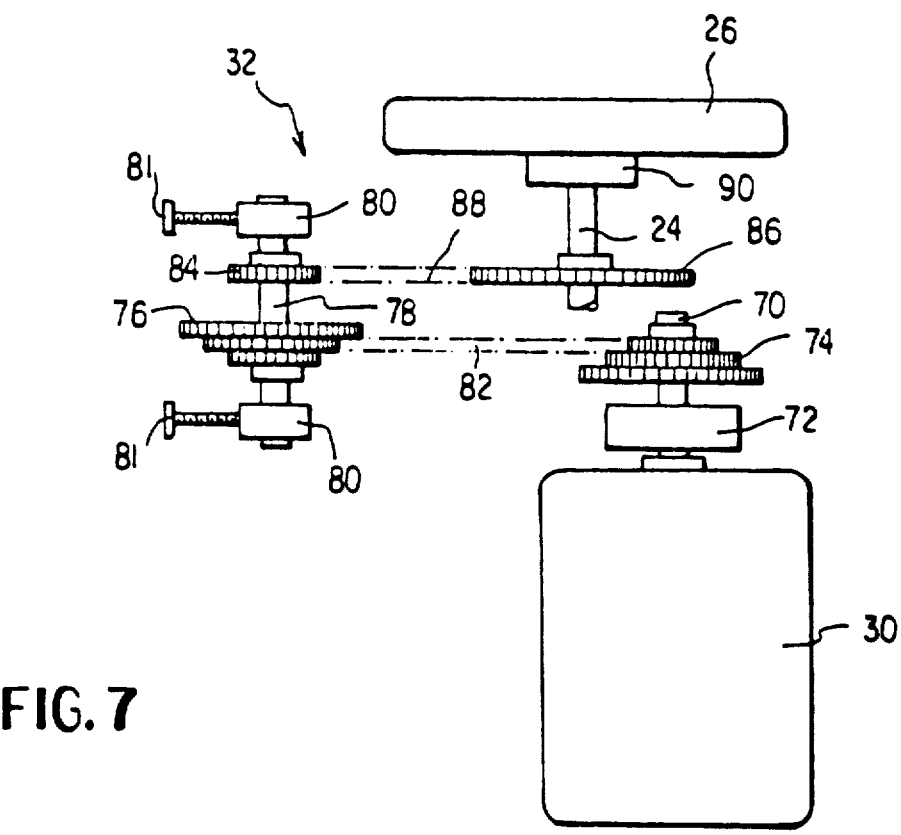
FIG. 7 is a schematic plan view of the power transmission.

The power transmission 32 is shown schematically in FIGS. 6 and 7. The output shaft 70 of the motor 30 is connected to a centrifugal clutch 72 of the type which is engaged when the motor output is above a preselected rpm. Keyed to the clutch output shaft are a set of stepped sprocket wheels 74. A complementary set of stepped sprocket wheels 76 are keyed to a jack shaft 78 journalled in bearings 80 mounted on the frame assembly longitudinal bar 48 and the adjacent side member 40. A first drive chain 82 connects a selected one of the sprocket wheels 74 to the corresponding sprocket wheel 76. An additional sprocket wheel 84 keyed to the jack shaft 78 transmits power to a further sprocket wheel 86 which is keyed to the axle 24 by means of a second drive chain 88. The jack shaft bearings 80 are located in close proximity to the forward subframe mounting 60 in order to minimize variation in the distance between the sprocket wheels 84 and 86 due to movement of the wheels and subframe relative to the main frame. In order to permit adjustment of the chain tightness, the jack shaft bearings 80 may be mounted for longitudinal movement on the side member 40 and bar 48 with adjustment screws 81 connected between the bearings and fixed points on the frame for holding the bearings in the desired position.

Figure 8:
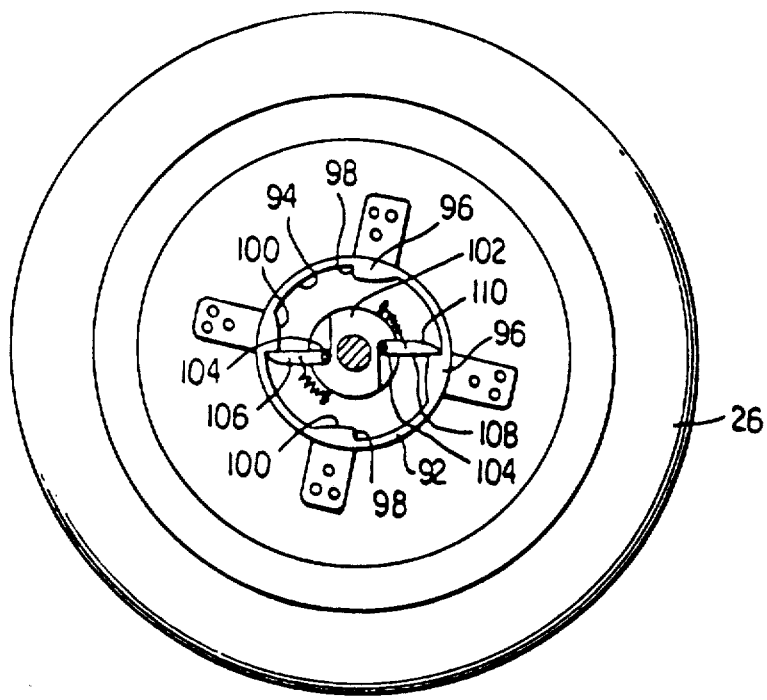
FIG. 8 is cross sectional view showing the wheel clutch arrangement.

Each of the wheels 26, 28 is connected to the axle 24 by an overrunning clutch 90 to permit free wheeling. The clutch is illustrated in FIG. 8 and includes a hub 92 secured to the wheel 26, the hub having a cylindrical inner surface 94 concentric with the wheel axis and a plurality of radially inwardly projecting lugs 96. Each lug, of which there preferrably are four uniformly spaced about the inner surface, has a first face 98 in a substantially radial plane and a second face 100 sloping gradually inwardly from the cylindrical surface. A plate 102 affixed to and rotating with the axle 24 mounts a pair of diametrically located pins 104 on which are journalled pawls 106, the outer end of each pawl having a flat first side 108 for engaging the first face 98 of a lug and a curved second side 110 permitting the pawl to ride over the second face 100 of a lug. The pawls are spring-loaded so as to maintain driving engagement with the lugs except when the rotational velocity of the wheel exceeds that of the axle.

Figure 10:
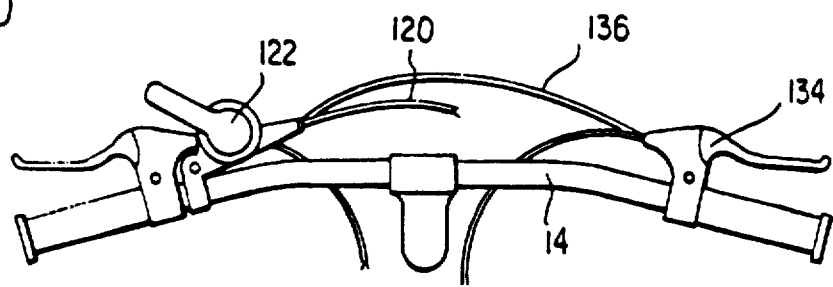
FIG. 10 is an illustration of the handlebar mounted control mechanisms.
Figure 9:
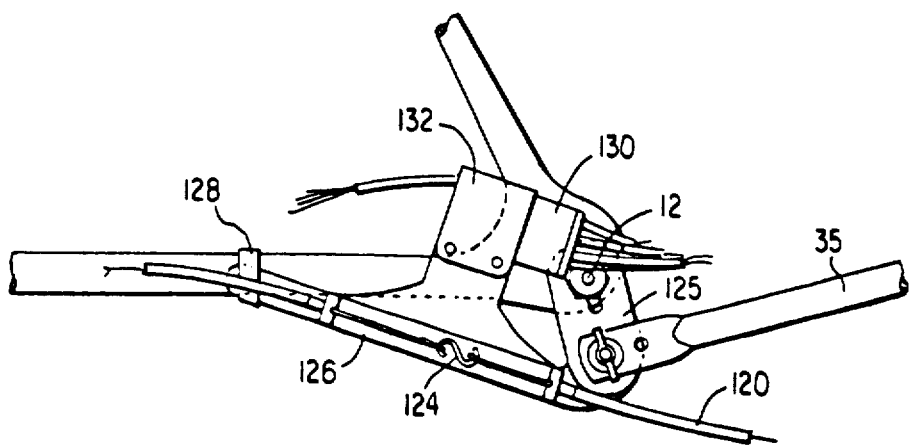
FIG. 9 is a fragmentary elevational view of the connection between the rear axle of the bicycle and the power pack hitch assembly.

The hitch assembly 34 is, preferrably, a gimbal type hitch such as the hitch shown in FIGS. 9 and 10 of my above-mentioned U.S. Pat. No. 4,461,365 and described at col. 6, lines 6-32 thereof. The hitch assembly includes a yoke the forward ends 35 of which extend forwardly on opposite sides of the bicycle rear wheel and are connected to mounting brackets 125 of generally L-shape configuration. As is shown in FIG. 9, the end of the shorter leg of the bracket 125 is attached to the bicycle rear axle 12 and the longer leg thereof extends forwardly along the frame of the bicycle and is secured to the frame by a clamp 128. This arrngement, in which the mounting brackets 125 are secured to the bicycle at two spaced points provides a stable point of attachment of the power pack to the bicycle.

The control linkages include a control cable 120 extending from the motor speed control to a a handlebar mounted actuating lever 122. As is shown in FIG. 9, the cable 120, which is a flexible, sheathed pull cable, includes a releasable connection 124 located closely adjacent the point of attachment of the hitch assembly 34 to the bicycle rear axle 12. The connection 124 is supported by longer leg 126 of the mounting bracket 125 located on the side of the bicycle opposite that of the pedal and chain assembly, the leg serving to maintain alignment of the cable for smooth, reliable operation. A multiple conductor electrical cable 130 is also a part of the control linkages and includes a separable connector 132 carried by the stabilizer bar 126. The electrical cable serves to connect a handlebar mounted engine cut-off switch and turn signal and brake light controls to the motor and power pack mounted lights, respectively. Location of the connectors 124 and 132 in close proximity to the hitch assembly attachment point facilitates the attachment or removal of the power pack.

Figure 10A:
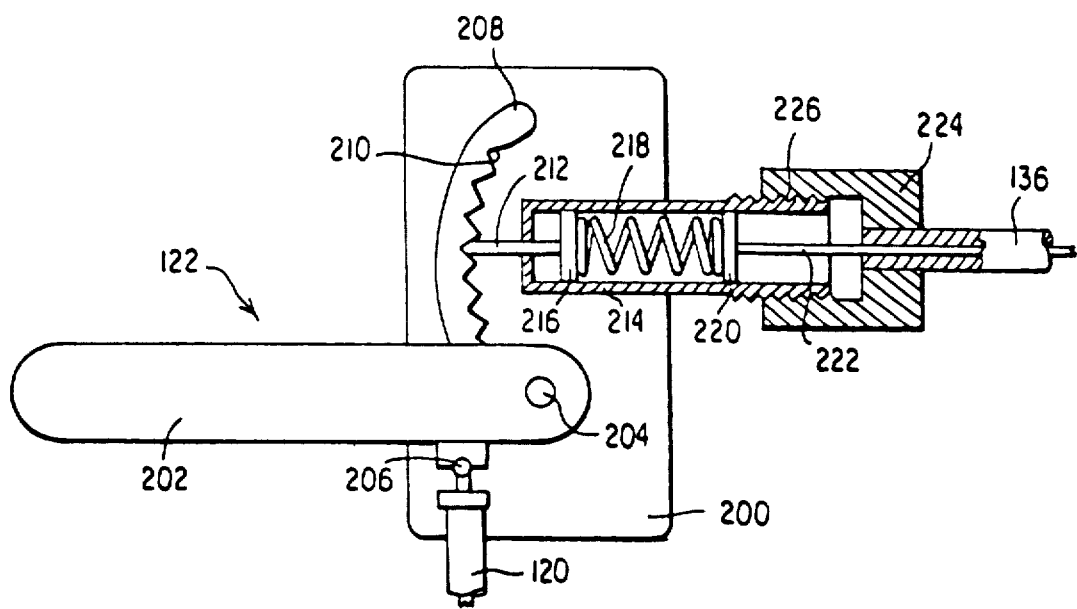
FIG. 10A is an illustration, partially in cross section, of the motor speed and cruise control mechanism.
Figure 11:
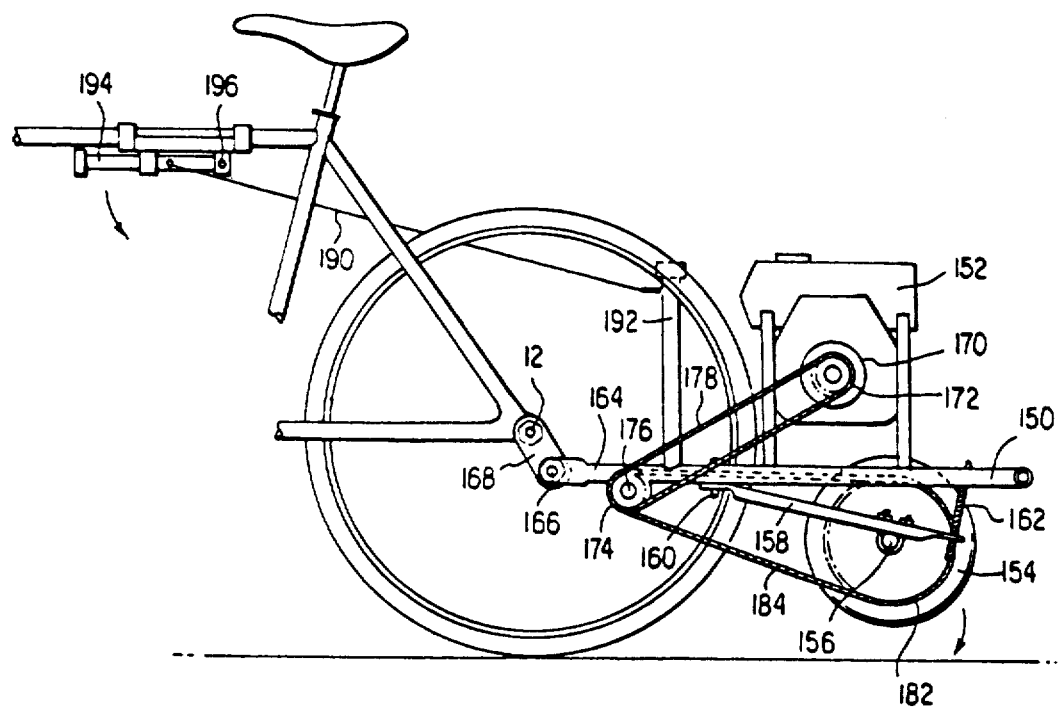
FIG. 11 is a side elevational view of a second embodiment of the bicycle power pack of the present invention.

As is shown in FIG. 10, the speed control lever 122 may be of the type which is capable of holding a set position thus permitting the rider to set a desired speed which is then maintained without requiring continued holding of the lever. With a control of this type, it is preferrable that the speed control lever 122 be interconnected with the brake lever 134, as by a cable 136, so that the lever 122 automatically returns to the idle position upon actuation of the brakes. One form of such a control arrangement is shown, somewhat schematically, in FIG. 10A. A hand lever 202 is pivotally connected to a base plate 200 by a shaft 204 and includes a connector 206 to which the motor speed control cable 120 is attached. As is shown in FIG. 11 of my U.S. Pat. No. 4,461,365, the opposite end of the control cable is connected to the motor speed control and is spring-loaded so as to be biased into the idle position. An arcuate arm 208 extends from and moves with the hand lever 202, the arm being provided with a series of ratchet teeth 210. A pawl 212 projects from one end of a tube 214 which is affixed to the base 200 and is biased outwardly into engagement with the ratchet teeth by a compression spring 218 one end of which bears against a washer 216 secured to the inner end of the pawl and the other end of which bears against a second washer 220 secured to the end of the control wire 222 of the control cable 136 the opposite end of which is attached to the handbrake lever 134. An intrnally threaded connector 224 connects the control cable 136 to the threaded end 226 of the tube 214. When the control mechanism 122 is in the position shown in FIG. 10A, that is with the hand brake lever 134 released and the connector 224 threaded fully onto the tube 214, the cruise control feature is engaged. In this position, the spring 218 exerts sufficient force on the pawl 212 to maintain the pawl in engagement with a ratchet tooth, thus overcoming the bias of the idle return spring. If the hand brake lever 134 is actuated, the control wire 222 and washer 220 are retracted thus leasening the force of the spring 218 so that the pawl is forced out of engagement with the ratchet tooth due to the force of the idle return spring and the motor returns to idle speed. The cruise control feature can be overridden by partially unscrewing the connector 224 from the tube 214 which also serves th back off the washer 220 thereby lessening the force of spring 218.

Completing the description of this embodiment of the power pack, a guard 140, suitably attached to the power pack frame, covers the exposed portions of the chain drive. Also, a cargo carrier 142, which may be a lidded compartment, is provided above the motor, the carrier being supported by rods 144 extending upwardly from the corners of the power pack frame.

Figure 12:
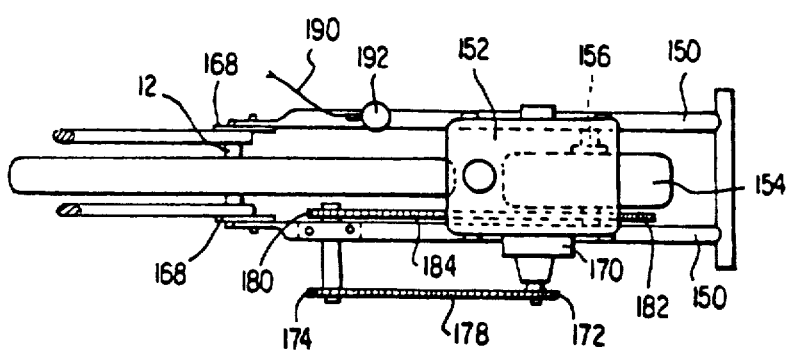
FIG. 12 is a top plan view of the second embodiment.

Referring now to FIGS. 11 and 12, a light duty version of the bicycle power pack will be described. The power pack of this embodiment includes a frame 150 which mounts a small gasoline engine 152. A single ground-engaging wheel 154, the axle 156 of which is journaled on a subframe 158 connected to the main frame by front 160 and rear 162 spring mounts, is located below the motor with the axle 156 in vertical alignment with the center of gravity of the power pack assembly. The side rails of the main frame 150 include forward extensions 164 extending on opposite sides of the bicycle rear wheel to pivotal connections 166 on connector links 168 attached to the bicycle rear axle mountings. The power transmission includes a centrifugal clutch 170 connected to the motor output shaft and driving a first sprocket wheel 172, an idler shaft 174 journaled on one of the side rail extensions 164 and carrying a second sprocket wheel 176 driven by chain 178 from sprocket wheel 172 and a third sprocket wheel 180, and a fourth sprocket wheel 182 connected to the ground engaging wheel 154 and driven from the third sprocket wheel by a second chain 184.

When it is desired to use the bicycle without the power assist of the light duty power pack, the power pack is raised so that the wheel 154 is elevated from the ground. To accomplish this, a lift wire 190 is provided, one end of the wire being connected to the upper end of a vertical tube 192, the lower end of which is rigidly connected to the power pack frame 150, and the opposite end of the lift wire being attached to a lift handle 194 pivotally connected at 196 to a convenient point on the bicycle frame.

While, in the described embodiments, the bicycle power pack is powered by a gasoline engine, it will be apparent that an electric motor supplied by a storage battery may be employed in place thereof. In such an arrangement, the motor and battery are located on the power pack frame so that the combined center of gravity of the motor and battery is vertically aligned with the axle of the ground engaging wheel or wheels.

It will also be apparent that additions and modifications may be made to the described embodiments. For example, in a gasoline engine powered power pack, the engine may be equipped with an electric starter. Also, a generator may be provided and driven by the gasoline engine to supply power for accessories such as lights and the like As these and other changes and additions may be had in and to the described embodiments of the invention without departing from the spirit thereof, reference should be had to the appended claims in determining the true scope of the invention.

I claim:

1. In a bicycle propelling device having a frame, an axle journaled to the frame, a pair of ground engaging wheels carried by the axle, a motor mounted on the frame, transmission means for conveying power from the motor to the axle and wheels, and a hitch assembly connected to and extending forwardly from the frame and including a pair of arms extending on opposite sides of the rear wheel of the bicycle for connection to the rear axle of the bicycle, the improvement characterised in that:

the motor is mounted on the propelling device frame in a position which places the center of gravity of the motor and frame in vertical alignment with the wheel carrying axle whereby the imposition of weight transfer from the propelling device to the rear axle of the bicycle during turning of the bicycle is prevented thus improving the stability of the bicycle and propelling device combination;

each of the ground engaging wheels is drivingly connected to the axle by an overrunning clutch; and the tranmission means includes a centrifugal clutch driven by the motor, a first sprocket wheel driven by the clutch, an idler shaft journaled on said frame forwardly of the motor, a second sprocket wheel keyed to the idler shaft, a first drive chain interconnecting the first and second sprocket wheels, a third sprocket wheel also keyed to the idler shaft, a fourth sprocket wheel keyed to the axle, and a second drive chain interconnecting the third and fourth sprocket wheels.

2. The improvement in a bicycle propelling device as set forth in claim 1 further characterized in that:

the first sprocket wheel and the second sprocket wheel are each one of a set of stepped sprocket wheels.

* * * * *